May 30, 1933.  W. H. DELAHAYE  1,911,439
BRAKE
Filed May 1, 1929

INVENTOR:
WALTER HAMILTON DELAHAYE.

BY  ATTORNEY

Patented May 30, 1933

1,911,439

UNITED STATES PATENT OFFICE

WALTER HAMILTON DELAHAYE, OF OTTAWA, ONTARIO, CANADA, ASSIGNOR TO BENDIX BRAKE COMPANY, OF SOUTH BEND, INDIANA

BRAKE

Application filed May 1, 1929. Serial No. 359,447.

This invention relates to improvements in brakes and specifically to those automobile brakes which are known as self-energizing or servo brakes.

One object of the invention is to apply the servo principle to two shoe brakes. Another object is to have a construction which will have a good braking effect even when the drum is not rotating. Still another object is to accomplish the above objects and obtain at the same time a servo action regardless of the direction of the rotation of the drum.

From one point of view an important phase of the invention relates to a novel device such as a lever rocked by circumferential movement of the brake friction means and which is effective to force the friction means outwardly against the drum, preferably immediately adjacent its anchorage.

These objects are accomplished by the mechanism shown in the accompanying drawing and described in the specification appended hereto.

Referring now to the accompanying drawing, which illustrates by way of example two embodiments of the invention, Figure 1 shows an elevation of the preferred form of brake, the shoes being shown applied but prior to any servo action;

Figure 1:
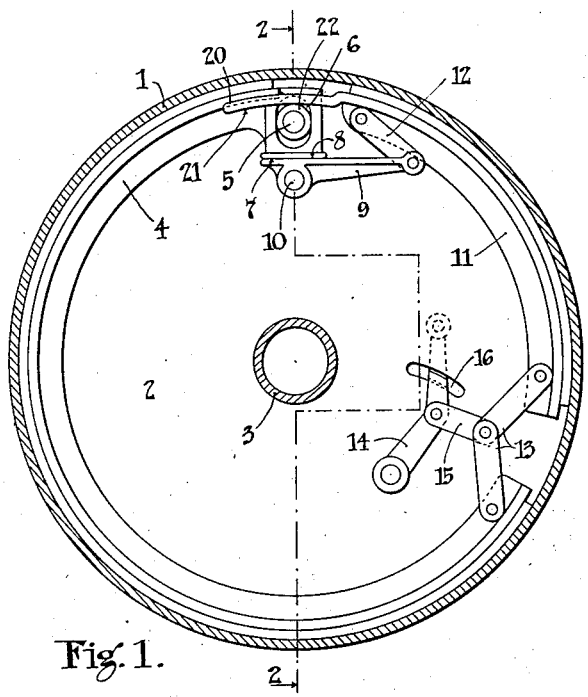
Figure 2:
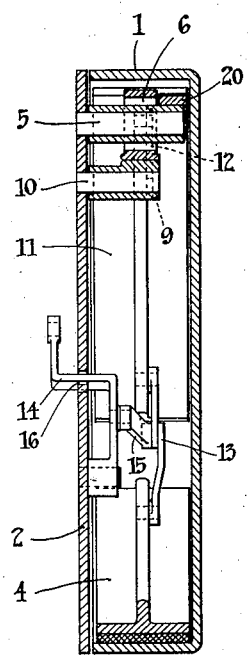
Figure 2 is a section substantially on the line 2—2 of Figure 1.

Referring to the drawing in which similar references are used in referring to the same parts throughout the views and especially to Figures 1 and 2, 1 denotes a brake drum, 2 the fixed flange or backing plate on the axle 3, and 4 a part of the brake friction means, here illustrated as an anchored shoe. The latter is of usual construction being shown of T-cross section and carrying the usual lining. The mouting of the friction means on the anchor 5, however, is novel as this is accomplished by a slot 6 which preferably is in a general radial direction. The portion of the friction means below the slot is furnished with a bearing surface 7. This surface is engaged by a similar opposed surface 8 carried by a lever 9 which is pivoted on the fixed pivot 10, the ends of the surface 8 forming in effect thrust shoulders on opposite sides of the anchorage 5. This pivot 10 lies substantially in the same radial plane as the anchor 5. The friction means also preferably includes a servo shoe 11 which occupies the major part of the remaining arc of the circle and which is shown pivotally attached by means such as link 12 to the free end of the lever device 9. The end of the servo shoe 11 may be continued to provide an extension 20 which has a bearing surface 21 concentric with the axis of the brake. This surface is adapted to ride on the pivot or anchorage 5 when movement of the servo brake takes place. The pivot 5 may be provided with a roller 22. The free end of the servo shoe and the fixed shoe, which together in the illustrated embodiment of the brake make up the friction means, are connected by applying means such as a toggle 13 which may be operated by any type of lever, for instance that shown at 14. This lever 14 is connected to the toggle by link 15 and the free end passes through a slot 16 in the flange 2 so that it may be connected to the usual brake rod.

The operation of the device will now be described. On application of a force to the toggle the adjacent ends of the shoes are applied and if the machine is at rest a satisfactory braking effort may be secured. However, if the drum 1 is rotating the shoe 11 will have a tendency to travel therewith. This will exert a pull on the lever 9, the direction depending on the sense of rotation of the drum. In either direction the lever 9 will be rocked and such movement through the surfaces 7 and 8 causes the anchored end of the shoe 4 to be urged radially, which augments the braking action set up by the toggle.

When the direction of rotation is such that the servo shoe revolves towards the end of the anchored shoe to which it is attached here, the toggle being in approximately its straightened position, a circumferential force will be applied to augment the force due to the toggle alone.

Figure 3:
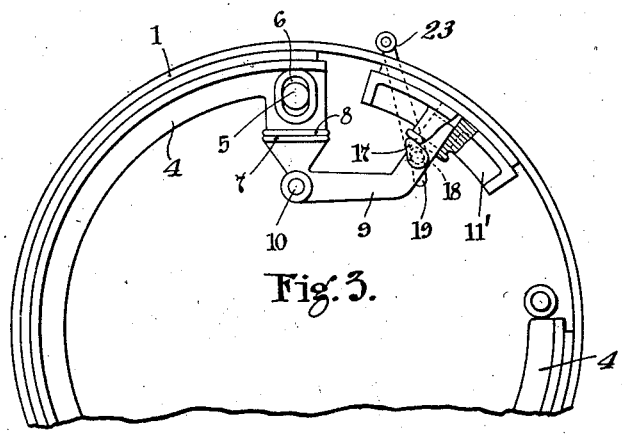
Figure 3 is a fragmentary view of a modification.

Referring to Figure 3, instead of a floating servo shoe, one which has sliding engagement with the lever 9 is provided. This servo shoe 11' is similar to that shown in a copending application and is similarly operated by means of a cam 17 mounted on the shaft 18 which is journalled in the lever 9. The shaft 18 has an arm 23 external to the flange which is provided with a slot 19 to allow the shaft to project therethrough and such arm is connected to the usual brake rod. In this construction the end of shoe 4 which is remote from that on the pivot 6 is mounted on a fixed pivot. It will be understood that movement of the servo shoe 11' will operate the lever 9 regardless of which way the drum 1 rotates and thus apply the brake.

In the drawing all return springs, stops and adjusting devices have been omitted as these may be constructed in any of the ways known to those skilled in the art.

The invention is not to be taken as limited to the specific disclosure made herein as various changes will be suggested to those constructing such a brake, but it is the intention to cover the device as broadly as the scope of the appended claims will permit.

What I claim is:

1. In a brake and in combination with a fixed support, an anchor on said support, a shoe anchored thereon, said shoe having limited movement in a radial direction on said anchor, a servo shoe, means for forcing the adjacent ends of said shoes into engagement with a drum and means operated by the movement of said servo shoe with said drum to cause outward movement of the first mentioned shoe on said anchor.

2. In a brake as set forth in claim 1, said first mentioned shoe having a bearing surface below said anchor and said last mentioned means consisting of a cam lever engaging said surface, said lever being connected to that end of the servo shoe which is adjacent said anchor.

3. In a brake and in combination with a fixed support, a pair of fixed pivots on said support lying substantially in the same radial plane, a shoe anchored on the outer of said pivots, said shoe having limited radial movement thereon, a lever mounted on the other pivot, said lever having a cam surface adapted to contact with a complementary surface on said shoe, a servo shoe carried by said lever and means for applying the free ends of said shoes to a brake drum.

4. In a brake as claimed in claim 3, said surface on said lever being adapted to move the engaged shoe outwardly on movement of said lever in either direction.

5. In a brake as claimed in claim 1, said servo shoe having an extension riding on said anchor.

6. In a brake as claimed in claim 1, said servo shoe having an extension riding on said anchor, the surfaces engaged thereon being concentric with the axis of the brake.

7. In a brake as claimed in claim 1, said servo shoe having an extension concentric with the axis of said brake, a fixed support on which said surface may ride.

8. In a brake as claimed in claim 3, said servo shoe having an extension presenting a surface concentric with the axis of said brake, said surface engaging the outer edge of one of said pivots.

9. In a brake, and in combination with a fixed support, a pair of pivots on said support, said pivots lying in the same radial plane and one of said pivots being adjacent the periphery of said support, a brake shoe mounted for limited radial movement on said outermost pivot, a bearing surface on said shoe lying at right angles to said radial plane on either side thereof, and between said pivots, a lever pivoted on the other pivot having a surface engaging the above mentioned surface of the shoe and a servo brake, said brake being adapted to operate said lever.

10. In a brake, as described in claim 9, said servo shoe having an extension presenting a surface concentric with the axis of the brake, said surface riding on the outermost pivot.

11. A brake comprising a rotatable drum, an anchored shoe, a servo shoe, means for transmitting brake applying force from the servo shoe to the anchored shoe in both directions of drum rotation, and separate means for transmitting additional brake applying force from the servo shoe to the anchored shoe in one direction of rotation.

12. A brake comprising a rotatable drum, an anchored shoe, a servo shoe, a lever for transmitting brake applying force from the servo shoe to the anchored shoe in both directions of drum rotation, and a link for transmitting additional brake applying force from the servo shoe to the anchored shoe in one direction of rotation.

13. A brake comprising a rotatable drum, a servo shoe, an anchored shoe, said servo shoe being arranged to force one end of the anchored shoe against the drum in both directions of rotation and the opposite end of the shoe against the drum in one direction of drum rotation.

14. A brake comprising a rotatable drum, a servo shoe, an anchored shoe, said servo shoe being arranged to apply radial force to one end of the anchored shoe in both directions of rotation and a thrust force to the opposite end of the shoe in one direction of drum rotation.

15. A brake comprising a shoe anchored at one of its ends and a servo shoe, said servo shoe having a camming connective relation with one end of the anchored shoe and a linked connection to the other end.

16. A brake comprising a brake shoe anchored at one end, and a servo shoe, said servo shoe having a camming connective relation with the anchored end of the first mentioned shoe and a linked connection to the other end.

17. A brake comprising a brake shoe anchored at one end, a servo shoe, link means connecting the free end of the anchored shoe to the servo shoe, and means for causing rotation of the servo shoe to produce radial movement of the anchored end of the first mentioned shoe.

18. A brake comprising an anchored shoe, a servo shoe circumferentially movable between the ends of the anchored shoe and coactive with both ends thereof for rendering the anchored shoe effective.

19. A brake comprising an anchored shoe radially movable at its anchored end, a servo shoe, a lever radially slidable in the servo shoe and pivotally mounted adjacent the anchored shoe, said lever having one end contacting the anchored shoe for moving it radially, and means on the lever coacting with the servo shoe for moving the same relative to the lever.

20. A brake comprising an anchor, a shoe radially movable thereon, a servo shoe, a lever having a slidable connection with the servo shoe and rockable therewith, said lever being arranged to move the anchored shoe radially, and means to move the servo shoe into operative position.

21. A brake comprising friction means, a fixed pivot, and a rigid lever pivotally mounted on said pivot and connected to the fraction means to be rocked thereby when applied and which lever has a part thrusting against a portion of the friction means and forcing it outwardly when the lever is rocked, together with brake-applying means mounted on and carried by said lever.

22. A brake comprising friction means, a fixed pivot, and a rigid lever pivotally mounted on said pivot and connected to the fraction means to be rocked thereby when applied and which lever has parts on opposite sides of the pivot and one or the other of which is operative to force the adjacent portion of the friction means outwardly when the lever is rocked upon application of the brake, together with the brake-applying means mounted on and carried by said lever.

In testimony whereof I have affixed my signature.

WALTER HAMILTON DELAHAYE.